United States Patent
Wu et al.

(10) Patent No.: US 7,343,353 B1
(45) Date of Patent: Mar. 11, 2008

(54) METHOD TO TURN OFF MACHINES DURING-TURN DOWN PERIOD WHILE ACHIEVING MINIMUM COST AND REQUIRED CYCLE TIME

(75) Inventors: Kan Wu, HsinChu (TW); Shu-Chuan Tu, Hsinchu (TW); Chang-Jang Lou, Tai-chung (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1143 days.

(21) Appl. No.: 10/210,957

(22) Filed: Aug. 2, 2002

(51) Int. Cl.
- G06F 17/00 (2006.01)
- G06F 9/46 (2006.01)
- G06F 19/00 (2006.01)
- G06G 7/00 (2006.01)
- G06Q 99/00 (2006.01)
- G05B 19/418 (2006.01)

(52) U.S. Cl. .............. 705/400; 705/1; 705/8; 700/99; 700/103; 700/173; 700/174

(58) Field of Classification Search ............. 705/1, 705/8, 400; 700/99, 103, 173–174
See application file for complete search history.

(56) References Cited

U.S. PATENT DOCUMENTS

| | | | |
|---|---|---|---|
| 5,148,370 A | 9/1992 | Litt et al. ............. 364/468 |
| 5,721,686 A | 2/1998 | Shahraray et al. ..... 364/468.08 |
| 5,826,040 A | 10/1998 | Fargher ............. 395/208 |
| 5,880,960 A * | 3/1999 | Lin et al. ............. 700/99 |
| 6,259,959 B1 * | 7/2001 | Martin ............. 700/99 |
| 6,459,946 B1 * | 10/2002 | Villanova et al. ......... 700/111 |
| 6,725,113 B1 * | 4/2004 | Barto et al. ............. 700/99 |
| 6,823,228 B2 * | 11/2004 | Funke et al. ............. 700/111 |
| 6,978,222 B2 * | 12/2005 | Roser et al. ............. 702/182 |
| 2002/0052770 A1 * | 5/2002 | Podrazhansky ............. 705/7 |
| 2003/0050817 A1 * | 3/2003 | Cargille et al. ............. 705/8 |
| 2003/0065415 A1 * | 4/2003 | Hegde et al. ............. 700/100 |

OTHER PUBLICATIONS

Weng et al., A Tool Portfolio Planning Methodology for Semiconductor Wafer Fabs, 1999, IEEE, pp. 11-14.*
Marcoux et al., Determining Capacity Loss From Operational and Technical Deployment Practices in a Semiconductor Manufacturing Line, 1999, IEEE, pp. 3-5.*
Martin, Key Factors in Designing a Manufacturing Line to Maximize Tool Utilization and Minimum Turnaround Time, 1993, IEEE, pp. 48-53.*
"How the Law of Unanticipated Consequences Can Nullify the Theory of Constraints : The Case for Balanced Capacity in a Semiconductor Manf. Line," by Dr. Donald P. Martin, 1997, IEEE, SEMI Adv. Semiconductor Manuf. Conf., pp. 380-385.
"Optimum Tool Planning Using the X-Factor Theory," by Ozawa et al., 1999 IEEE, pp. 49-52.

* cited by examiner

Primary Examiner—John W. Hayes
Assistant Examiner—Fadey S. Jabr
(74) Attorney, Agent, or Firm—Haynes and Boone, LLP

(57) ABSTRACT

A method and system for determining which machine tools to turn off during slow periods to achieve maximum cost savings with minimum cycle time increase. It uses a product demand forecast and a simplified approach to the X-factor theory to provide an objective, analytical model showing the cost savings of potentially turning off different quantities and types of machine tools versus the resulting impact on increased cycle time. This model, which can be visually plotted into a graph, can aid management decision as to the optimum machine tools to turn off while fine-tuning the marginal machine choices can keep cycle time under a predetermined acceptable maximum.

28 Claims, 2 Drawing Sheets

SHUT DOWN TOOLS BLOW 90% UTILIZATION

METHOD TO TURN OFF MACHINES DURING-TURN DOWN PERIOD WHILE ACHIEVING MINIMUM COST AND REQUIRED CYCLE TIME

BACKGROUND OF THE INVENTION

1. Field of Invention

This invention relates generally to tool utilization in a manufacturing production line and, more particularly, to minimizing costs by determining which machine tools can be turned off during a down-turn period for maximum savings and minimum increase in cycle time.

2. Description of Related Art

In a large manufacturing foundry today, many complex processes are frequently used to produce a product. This is especially true in the semiconductor industry where many tools are necessary to produce the final chip product from a designer's data. These required tools are state-of-the-art and are frequently very expensive to build and run. The useful lifetime of these tools can be short due to changes in technology. To reduce the tool's cost, they must be used as near to maximum capacity as possible to amortize their cost over as long a useful life as possible. Still running, idle tools are not producing product and are costing money due to lost opportunity and unnecessary running costs. A dilemma often occurs on how to responsibly turn off some machine tools during these low production times to save operating costs yet keep fabrication timely and efficient. Unwise turning off of machine tools can lead to increased total building or cycle times of product runs, which in turn can lead to delays, bottlenecks, and unhappy customers.

Keeping tool utilization at a maximum can be very difficult in complex manufacturing environments where each product may need several machine tools to be built, and there can be several products being built concurrently that require different sequences of tools. Also, customers' designs might not need all the machine tools available. For example, a specific logic wafer tool may not be required for the next large order being processed. Currently, manufacturers commonly deal with any down-turn periods by turning off machine tools based only on predefined utilization percentages such as 90% or 95%. Unfortunately, this does not take into account cost savings per machine when turned off or cycle time impact.

A new method is needed that provides a way to objectively determine the optimum machine tools of the right type and quantity to be turned off for greatest operational cost savings with the least impact to increased cycle time. This invention provides this new method.

In U.S. Pat. No. 6,259,959 (Martin) it describes a process for determining the performance of components in a manufacturing line. Articles by the same author (D. P. Martin), "How the Law of Unanticipated Consequences Can Nullify the Theory of Constraints, Semiconductor Fabtech," $7^{th}$ edition, pp. 22-34 and "How Tool Characteristics Affect the Cycle Time and Capacity of a semiconductor Manufacturing Line," Nov. 14, 1996 discuss X-factor theory. Katsutoshi Ozawa, Hideyuki Wada, and Tsuyoshi Yamaguchi in their article "Optimum Tool Planning Using the X-Factor Theory" reference these two articles as well as a third, "Breaking the Addiction to WIP: A Business Process for Driving Controlled Cycle-Time Improvement" by Greg Reichow, ISSM '98, when discussing using the X-factor theory in tool planning. In U.S. Pat. No. 5,826,040 (Fargher et al.) a method of planning a production schedule within a factory is disclosed. In U.S. Pat. No. 5,721,686 (Shahraray et al.) a method and apparatus for controlling and evaluating pending jobs in a factory is described. In U.S. Pat. No. 5,148,370 (Litt et al.) an expert system and method for batch production scheduling and planning is described.

SUMMARY OF THE INVENTION

This invention's overall objective is to provide a method and system for determining which machine tools to turn off during low production times so as to provide the greatest reduction in operational costs with a minimum increase in fab cycle time for a product. A more specific objective is to use a demand forecast to project the amount of future product to be run on the tools and to predict each machine tool's utilization based on that demand forecast.

It is another objective to recalculate a tool's utilization as the number of the turned-off machine tools of the same type increases, and still another objective to use utilization in a simplified form of the X-factor equation to calculate the theoretical cycle times of each machine tool. Using the theoretical cycle times, it is also an objective to derive the change in cycle time when one of the same-type machine tools is turned off Another objective is to divide the known monthly cost savings per tool when turned off by the change in theoretical cycle time when one same-type machine is turned off to obtain figures representing cost savings versus change in theoretical cycle time. Still other objectives are to use the cost savings versus change in theoretical cycle time figures to determine which machine tools to turn off and to keep fab cycle time within a predetermined maximum that has been set by the manufacturing management. Lastly, it is an objective to use fine-tuning of marginal turn-off tool choices to stay under this maximum acceptable fab cycle time.

These objectives are achieved by the method of this invention. This method and system sets up a model to describe the relationship between cost savings and cycle time increases when machines are turned off so that the right machines can be turned off to achieve the most cost savings while keeping cycle time at the required level.

BRIEF DESCRIPTION OF THE DRAWINGS

This invention will be described with reference to the accompanying drawings, wherein.

DETAILED DESCRIPTION OF THE PREFERRED EMBODIMENT

In large manufacturing companies today, many complex machine tools are often required to produce a single product. The raw product is loaded into these tools in a specific sequence until the final product is made. Tool operation is most cost-effective when production is high and all available tools are utilized at their maximum design capacity.

Figure 1:
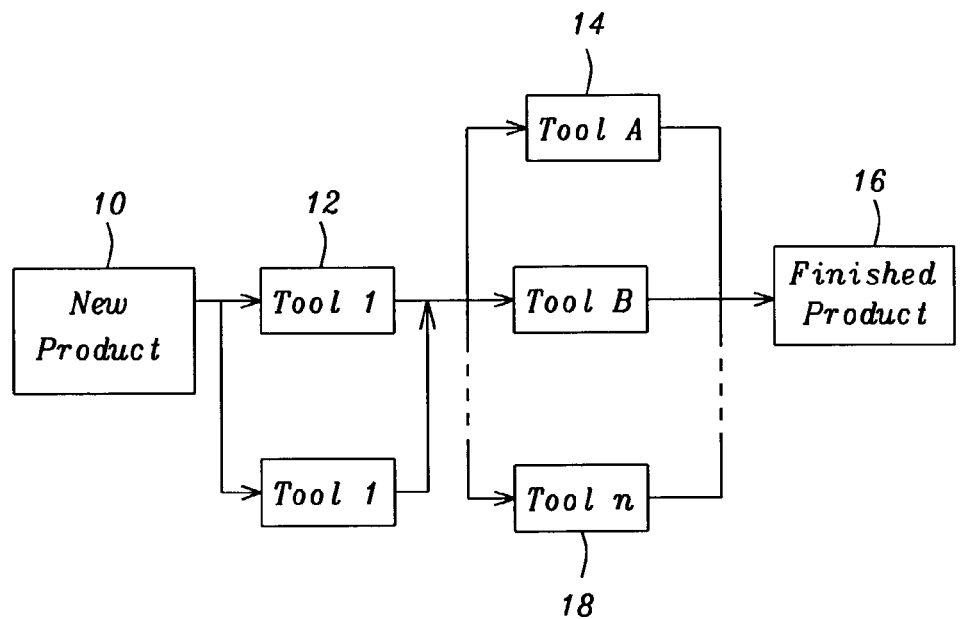
FIG. 1 is a flow diagram showing the prior art method.

When there is low utilization of machine tools due to low-production (down-turn) times or low demand for certain tools, decisions must be made as to which machines to turn off to save on operating costs. FIG. 1 illustrates a simple prior art manufacturing line to build a product. With high demand for the Product 10, all tool sets of Tool 1 and Tool 2 12 which perform the same task are 100% busy. Likewise the next set of tools, Tool A, Tool B, and up to Tool N 14 are busy producing the Finished Product 16. As demand falls for the new product, a decision needs to be made by management to shut down any tool that is not 90% utilized, Tool N 18. Some of the complex tools use large amounts of power or other resources to remain in operation, so turning them off can save a lot of money. However, this can increase the load on other same-type tools still running, plus it can take several hours to do the shutdown properly and several hours to start up the tool before it can process new product. This can affect the building of new product and increase total cycle time for the finished product. Most manufacturing facilities currently control the machine utilization by using a predefined utilization target such as 90% to 95%, shutting down a machine tool as soon as the workload falls below that target. This simple utilization target ignores the specific cost savings of each particular machine tool when shut down and the resulting increase to cycle time. The method of this invention provides a process to responsibly turn off machine tools by objectively considering cost reduction and cycle time impact while keeping in mind a predetermined acceptable maximum cycle time increase.

Figure 2:
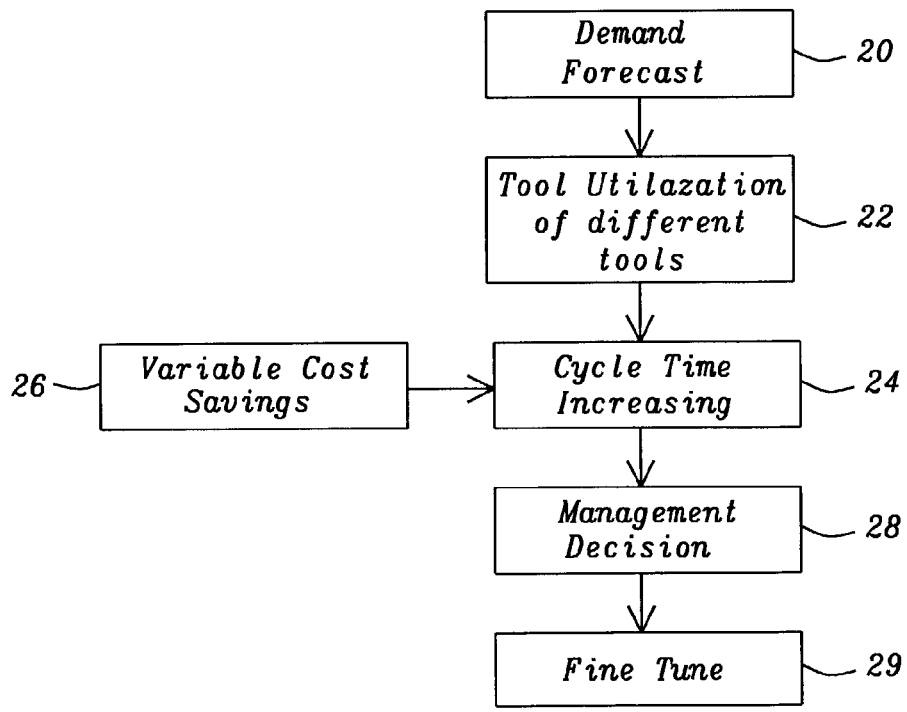
FIG. 2 is a flow diagram of the method.

FIG. 2 is a flow diagram of the new method. This is a procedure that is set up to find out which tools to turn off for maximum cost savings with minimum cycle time increase. A demand forecast 20 projects the amount of future product to be run on the machine tools. Each tool's utilization 22 can be predicted using this demand forecast and knowing how much product a tool can handle per hour so as to determine utilization by dividing production process time by tool production available time. If the machine tools are to be fully utilized, there would be no question but to leave all machines running. However, this is often not the case as customer demand is frequently not steady and some tools may not always be needed for different products.

To protect profit margins, it makes sense to turn some machine tools off to save on operational costs. For optimum cost savings and continuing customer satisfaction, criteria for turning machines off should take into account cost savings of each machine when turned off and the resulting increase to cycle time. Therefore, it is important to recalculate machine tool utilization according to the number of the turned-off machines. We previously determined Tool Utilization of Different Tools 22, and we know that theoretical raw process time (T-RPT) is equal to 1 divided by Wafers per Hour(WPH). Using the X-factor equation, we can now determine theoretical cycle time (T-C/T).

The original X-factor theory equation as proposed by D. P. Martin is:

$$X\text{-}factor = Cycle\_time/Run\_time = A*(1-Utl\%/2)/(1-Utl\%)$$

$$A = (1+(1-avail\%)*MTOL/(L+1)^L*Run\_time)$$

Where avail% is: fraction of time that the tool is available to run the product.

MTOL is: mean time off line.

L is: number of tools that can do the same process.

Utl% is: utilization percentage of tool, which is: Total Process Time/Total available Time.

Run time is: run's theoretical raw process time (T-RPT) in hrs./lot.

In general conditions on most Fab lines, tool availability is usually above 85% and the number of tools is greater than 2. This make A very close to 1 and allows the X-factor equation to be simplified and rewritten as:

$$X\text{-}factor = Cycle\_time/Run\_time = (1-Utl\%/2)/(1-Utl\%)$$

Table 1 contains actual Fab data examples of the data types we have determined thus far. It will further illustrate the next step of the process in FIG. 2, the comparison of Cycle Time Increasing 24 versus Variable Cost Savings 26.

TABLE 1

| Tool Type | Qty | WPH | Utl % | X-factor | T-RPT (Hrs) | T-C/T (Hrs.) | Delta C/T (Hrs.) | Cost Savings (all sets/ month) | Cost Savings K$/ Delta C/T |
|---|---|---|---|---|---|---|---|---|---|
| A | 3 | 26.2 | 51 | 1.51 | 0.0382 | 0.058 | | 0 | |
|   | 2 | 26.2 | 76 | 2.58 | 0.0328 | 0.098 | 0.0407 | 62,986 | 1,547.54 |
| B | 6 | 32.7 | 25 | 1.16 | 0.0306 | 0.036 | | | |
|   | 5 | 32.7 | 30 | 1.21 | 0.0306 | 0.037 | 0.0014 | 134,916 | 94,218.34 |
|   | 4 | 32.7 | 37 | 1.30 | 0.0306 | 0.040 | 0.0026 | 134,916 | 52,453.19 |
|   | 3 | 32.7 | 50 | 1.49 | 0.0306 | 0.046 | 0.0060 | 134,916 | 22,599.12 |
| C | 3 | 25.4 | 55 | 1.16 | 0.0394 | 0.063 | | | |
|   | 2 | 25.4 | 82 | 3.32 | 0.0394 | 0.131 | 0.0674 | 148,416 | 2,202.73 |
| D | 4 | 18.6 | 39 | 1.32 | 0.0537 | 0.071 | | | |
|   | 3 | 18.6 | 52 | 1.55 | 0.0538 | 0.083 | 0.0122 | 110,700 | 9,089.24 |
|   | 2 | 18.6 | 78 | 2.81 | 0.0538 | 0.151 | 0.0678 | 110,700 | 1,632.90 |
| E | 5 | 44.8 | 50 | 1.49 | 0.0223 | 0.033 | | | |
|   | 4 | 44.8 | 62 | 1.82 | 0.0223 | 0.041 | 0.0072 | 67,696 | 9,394.65 |
|   | 3 | 44.8 | 83 | 3.39 | 0.0223 | 0.076 | 0.0350 | 67,696 | 1,932.66 |
| F | 3 | 21.6 | 30 | 1.21 | 0.0462 | 0.056 | | | |
|   | 2 | 21.6 | 45 | 1.41 | 0.0462 | 0.065 | 0.0089 | 170,856 | 19,095.07 |
|   | 1 | 21.6 | 90 | 5.37 | 0.0462 | 0.248 | 0.1832 | 170,856 | 932.87 |

Table 1 shows several tool types (A through F), various data headings, and the calculations that are key to the process. In the column to the right of the tool type is shown the quantity (Qty) of that tool type left operating. The wafers per hour (WPH) that the tools can do is in the next column to the right. The utilization percentage (Util%) is the number determined using the demand forecast obtained in the prior step and the equation previously mentioned. The X-factor column's value is derived from utilization percentage used in the simplified equation. The next column is the theoretical raw process time (T-RPT) or run time. This is simply the reciprocal of wafers per hour or 1/WPH. Theoretical cycle time (T-C/T) in the next column or cycle time as stated in the simplified equation can be calculated using the simplified equation. The next column is the change in the cycle time or delta C/T that is calculated by subtracting T-C/T when a certain number of same-type machine tools are running from the T-C/T value when one less same-type machine tool is running. This delta C/T is the Cycle Time Increasing 24 when turning off a machine tool.

The Variable Cost Savings 26 in FIG. 2 of each tool is now needed to determine the best tools to shut down. This is a previously known amount based on how much money is saved when the tool is turned off. The cost savings column in Table 1 is this previously-determined value. Lastly, by dividing known monthly cost savings per tool when turned off by the change in theoretical cycle time, a cost savings versus change in theoretical cycle time figure can be calculated. This is the last column of Table 1. Looking down this column the largest values are chosen as the top candidates for the tools to be shut down. These are the tools that save the most money with the minimum impact on cycle time of the product.

Figure 3:
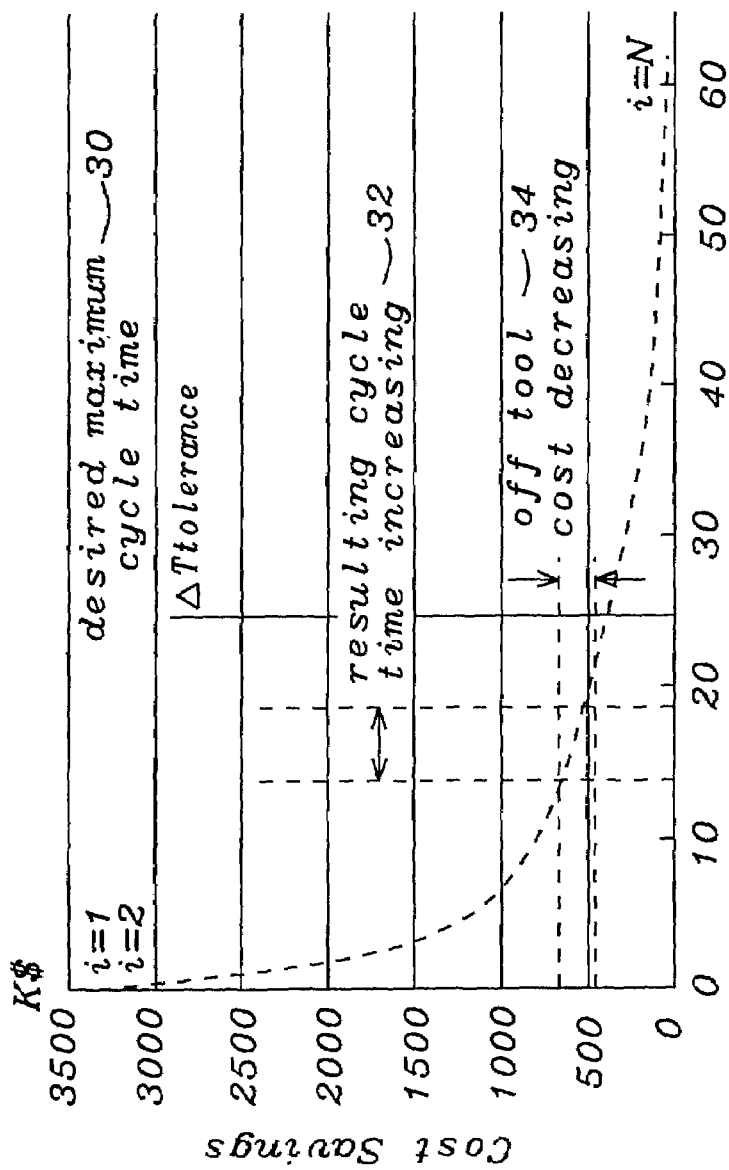
FIG. 3 is a graph of cost savings verses cycle time increasing.

FIG. 3 shows a resulting graph of Table 1 showing cost savings verses cycle time increase. Because turned-off tools can result in increased cycle time and tool utilization of remaining tools, management sets a predetermined, reasonable maximum cycle time or delta T tolerance not to exceed which is added to the graph as a vertical line 30. This maximum acceptable fab cycle time is the longest cycle time management thinks customers can be expected to tolerate. In FIG. 3, this number is 25. Increasing cycle time is represented on the x-axis and cost savings on the y-axis. The cost savings/delta C/T figures for tool numbers represented as dots have been sorted from highest to lowest value to give a smooth curve.

Shutting down a tool results in an increased cycle time exemplified by the resulting cycle time increase to the right of a particular tool dot as shown on the graph 32. The movement down is the value of the tool being turned off and the amount of the cost decreasing 34. As can be seen, all tools to the left of the desired maximum 30 are candidates to be shut down as they do not push the cycle time past the desired maximum and have highest cost savings. Tools to the right of the line if shut down would create a cycle time longer than desired. Therefore, this calculated chart allows an objective selection of the specific tools to be shut down to achieve the maximum cost savings while keeping the cycle time within a required level.

Management now can refer to the information derived by this method and system to make responsible, objective Management Decisions 28 when determining the optimum machine tool quantities and types to turn off in down-turn or low production periods.

The graph of FIG. 3 also illustrates how the final step of the new process from FIG. 2., the step to Fine-Tune 29, is carried out. Management has the capability of directly affecting the product cycle time by adjusting the desired maximum line 30 if this would be advantageous. This is important if a customer needs the finished product more quickly than anticipated. This can be seen if the desired maximum is moved to produce a shorter cycle time (moved to the left). Fewer specific machines would be shutdown and less money would be saved. This fine-tuning of cycle time takes into account both the customer's requirements and management's cost needs. Secondly, marginal turn-off tool type choices can be fine-tuned to keep fab cycle time under the maximum acceptable fab cycle time. For example, the last tool may go out past the target line, so therefore the next candidate may be chosen to be turned off until the cycle time limit constraint can be satisfied. This relationship can be expressed as follows:

$$Max(\Sigma_i \Delta T_i)$$

$$s.t.(\Sigma_i \Delta T_i) <= \Delta T_{tolerance}$$

$$i=[1,2, \ldots N], starting\_from\_i=1,\_Increment\_by\_1\_Sequentially$$

Where:
  T is the cycle time, T-C/T.
  i is the tool number.
  i is from 1 to N, where the order is sorted according to cost saving/delta C/T.
  s.t. is the selected tools.

The method of the invention provides advantages over the prior art in that it sets up a model to describe the relationship between cost savings and increase in cycle time when turning off machines. This model, which can be visually plotted into a graph, can help management determine turn-off tool types and quantity under a tolerated cycle time target to get the maximum cost savings. Additionally, it makes use of demand forecasting to predict amount of future product for calculating machine loading and utilization. It also provides for a simplified and easier to calculate form of the X-factor equation to determine the X-factors of each tool.

While the invention has been particularly shown and described with reference to preferred embodiments thereof, it will be understood by those skilled in the art that various changes in form and details may be made without departing from the spirit and scope of the invention.

What is claimed is:

1. A method for determining which of a plurality of machine tools to turn off during low production times for greatest operational cost savings with minimum fab cycle time increase, the method comprising:
  predicting said machine tools' utilization according to a demand forecast, said demand forecast projecting an amount of future product to be processed by said machine tools;
  calculating said machine tools' utilization according to a number of said machine tools that are turned off;
  calculating theoretical cycle times of said machine tools using an X-factor equation;
  selectively determining a change in said theoretical cycle times when one of said machine tools is turned off;
  calculating an operational cost savings versus said change in said theoretical cycle times by dividing a known monthly cost savings per tool when turned off by said change in said theoretical cycle times;
  using said calculated operational cost savings versus said change in said theoretical cycle times to determine at least one optimum one of said machine tools to turn off; and
  selecting one or more of said machine tools to turn off, wherein said selection is performed to maintain said fab cycle time under a predetermined maximum acceptable fab cycle time.

2. The method of claim 1, wherein said demand forecast is an anticipated amount of product to be processed by said machine tools during an upcoming period of time according to customer demand projections.

3. The method of claim 2, wherein said machine tools' utilization equals production process time divided by tool production available time.

4. The method of claim 3, wherein said production process time is equal to a theoretical raw process time.

5. The method of claim 4, wherein said theoretical raw process time is equal to the reciprocal of wafers per hour.

6. The method of claim 5, wherein, when said tool utilization is known, an X-factor can be calculated as follows:

$$X\text{-}factor = Cycle\_time/Run\_time = A*(1-Utl\%/2)/(1-Utl\%)$$

$$A = (1+(1-avail\%)*MTOL/(L+1)^L*Run\_time)$$

where avail% is: fraction of time that the tool is available to run the product;
MTOL is: mean time off line;
L is: number of tools that can do the same process, and
Utl% is: utilization percentage of tool equal to total process time/total available time.

7. The method of claim 6, wherein said Run_time is equal to said theoretical raw process time.

8. The method of claim 6, wherein said X-factor can be calculated using a simplified X-factor equation as follows:

$$X\text{-}factor = Cycle\_time/Run\_time = (1-Utl\%/2)/(1-Utl\%).$$

9. The method of claim 8, wherein said simplified X-factor equation is used to calculate said theoretical cycle times of said machine tools.

10. The method of claim 9, wherein the difference between the original said theoretical cycle time and a new theoretical cycle time calculated when said one of said machine tools is turned off is referred to as delta cycle time.

11. The method of claim 1, wherein said predetermined maximum acceptable fab cycle time is determined by management according to a maximum time customers can reasonably be expected to wait for their product.

12. The method of claim 11, wherein said selecting one or more of said machine tools to turn off is performed by selecting marginal ones of said machine tools most suitable to be turned off to keep under said maximum acceptable fab cycle time or by selectively adjusting said predetermined maximum acceptable fab cycle time.

13. The method of claim 12, wherein said selecting one or more of said machine tools to turn off can be expressed as follows:

$$Max(\Sigma_i \Delta T_i)$$

$$s.t.(\Sigma_i \Delta T_i) <= T_{tolerance}$$

$$i=[1,2, \ldots N], starting\_from\_i=1, Incrementing\_by\_1\_sequentially$$

where:
T is the theoretical cycle time;
I is the tool number;
I is from 1 to N, where the order is sorted according to cost saving/delta cycle time, and s.t. is the selected tools.

14. The method of claim 1 further comprising representing increasing cycle time versus cost savings in graphical form.

15. A system for determining which machine tools to turn off during low production times for greatest operational cost savings with minimum fab cycle time increase, comprising:
means for projecting an amount of future product to be processed by said machine tools using a demand forecast;
means for predicting said machine tools' utilization according to said demand forecast;
means for calculating said machine tools' utilization according to a number of said machine tools that are turned off;
means for calculating theoretical cycle times of said machine tools using an X-factor equation;
means for selectively determining a change in said theoretical cycle times when one of said machine tools is turned off;
means for calculating an operational cost savings versus said change in theoretical cycle times by dividing a known monthly cost savings per tool when turned of by said change in said theoretical cycle times;
means for using said calculated operational cost savings versus said change in said theoretical cycle to determine at least one optimum one of said machine tools to turn off; and
means for selecting one or ore of said machine tools to turn off, wherein said selection is performed to maintain said fab cycle time under a predetermined maximum acceptable fab cycle time.

16. The system of claim 15, wherein said demand forecast is an anticipated amount of product to be processed by said machine tools during an upcoming period of time according to customer demand projections.

17. The system of claim 16, wherein said machine tools' utilization equals production process time divided by tool production available time.

18. The system of claim 17, wherein said production process time is equal to theoretical raw process time.

19. The system of claim 18, wherein said theoretical raw process time is equal to the reciprocal of wafers per hour.

20. The system of claim 16, wherein, when said tool utilization is known, an X-factor can be calculated as follows:

$$X\text{-}factor = Cycle\_time/Run\_time = A*(1-Utl\%/2)/(1-Utl\%)$$

$$A = (1+(1-avail\%)*MTOL/(L+1)^L*Run\_time)$$

where avail% is: fraction of time that the tool is available to run the product;
MTOL is: mean time off line;
L is: number of tools that can do the same process, and
Utl% is: utilization percentage of tool equal to total process time/total available time.

21. The system of claim 20, wherein said run time is equal to said theoretical raw process time.

22. The system of claim 20 wherein said X-factor can be calculated using a simplified X-factor equation as follows:

$$X\text{-}factor = Cycle\_time/Run\_time = (1-Utl\%/2)/(1-Utl\%).$$

23. The system of claim 22, wherein said simplified X-factor equation is used to calculate said theoretical cycle times of said machine tools.

24. The system of claim 23, wherein the difference between the original said theoretical cycle time and a new theoretical cycle time calculated when one of said machine tools is turned off is referred to as delta cycle time.

25. The system of claim 15, wherein said predetermined maximum acceptable fab cycle time is determined by management according to a maximum time customers can reasonably be expected to wait for their product.

26. The system of claim 25, wherein said selecting one or more of said machine tools to turn off is performed by selecting marginal ones of said machine tools most suitable to be turned off to keep under said maximum acceptable fab cycle time or by selectively adjusting said predetermined maximum acceptable fab cycle time.

27. The system of claim 26, wherein said selecting one or more of said machine tools to turn off can be expressed by an equation:

$Max(\Sigma_i \Delta T_i)$ $s.t.(\Sigma_i \Delta T_i) <= \Delta T_{tolerance}$ $i=[1,2,\ldots N9$ ,$starting\_from\_i=1$, $Increment\_by\_1\_sequentially$ where:
- T is the theoretical cycle time;
- I is the tool number;
- I is from 1 to N, where the order I sorted according to cost saving/delta cycle time, and
- s.t. is the selected tools.

28. The system of claim 15 further comprising means for representing increasing cycle time versus cost savings in graphical form.

* * * * *